UNITED STATES PATENT OFFICE.

ANTONIO PELLETIER, OF PARKERSBURG, WEST VIRGINIA.

IMPROVED COMPOSITION FOR COATING WOOD, CLOTH, METALS, AND FOR FORMING VARIOUS ARTICLES.

Specification forming part of Letters Patent No. 63,087, dated March 19, 1867.

*To all whom it may concern:*

Be it known that I, ANTONIO PELLETIER, of Parkersburg, in the county of Wood and State of West Virginia, have invented certain new and useful Improvements in the Composition of Matter; and I do hereby declare that the following is a full, clear, and exact description thereof.

To enable others skilled in the art to construct and use my invention I will proceed to describe it.

My invention consists in making a new and useful improvement in the composition of matter for coating wood of all kinds, as well as all fibrous and porous materials, and for other purposes. This composition, when applied to wood or other perishable materials, makes a fire-proof coating, and I have discovered that when it is treated with a solution of muriatic acid it becomes water-proof.

It has been, and I believe is still, claimed that the pulp made from any of the vegetable fibers, as for making paper, when mixed with the silicate of soda in about equal proportions by weight, furnishes both a fire-proof coating as well as one that will be impervious to the most searching liquids. I have found, by actual experiment, that the substance produced in that way does not furnish a water-proof coating.

To make my composition, I take fifty pounds of the pulp of any vegetable fibrous matter, preferring that made from bamboo, sugar-cane, corn-stalks, or similar substances, prepared as for the making of paper, fifty pounds of soapstone or any mineral substance of a similar nature, three gallons of the liquid silicate of soda, three pounds of red lead, and three pounds of litharge, and thoroughly mix and incorporate them together till the whole mass becomes soft and plastic. In order to thoroughly mix and incorporate these materials into a soft and homogeneous mass, I place them in a vat provided with cylindrical rollers moved by steam or other power, and with mechanical devices for causing the mixture to pass constantly between the rollers; other mechanical arrangements may be used for producing the same result.

The composition thus made, and while in its plastic state, I apply with any suitable instrument to the surface of any kind of wood, whether green or dry, or to the surface of paper, pasteboard, cloth, leather, brick, stone, or other fibrous or porous materials which I desire to make proof against fire alone, and then suffer it to dry. I also apply it to iron or other metal surfaces when I desire to protect them from the action of fire. When I desire to make the coating not only fire-proof, but also impervious to water or other searching fluids, I treat it with a solution of muriatic acid, composed of one part acid and three parts water, in about two hours after the coating has been applied, and before it becomes perfectly dry. This renders the coating perfectly impervious to water and other searching liquids, as well as fire-proof.

I use my composition for coating the surfaces of all kinds of wood or other fibrous substances, as well as brick, stone, iron, or any substance that I desire to protect from the injurious effects of fire, and then treat the coating with my solution of muriatic acid when I wish to protect the surfaces from the action of water or other searching liquids. My composition I also claim to be elastic to such a degree as not to be affected by the contraction or expansion of the substance to which it is applied, and, while exceedingly tough, is sufficiently hard to receive a high degree of polish.

In its preparation it may be given any desirable color, either plain or variegated, by the admixture of colors; or, after it has been applied and becomes hard, it may be given or painted any color required.

My composition is especially useful and valuable for covering the roofs of houses or other buildings. Being thoroughly water-proof, and not affected by the shrinking of the boards, and at the same time fire-proof, it combines all the requisites of a perfect roofing material. In all respects it makes a better roof than shingles, and in most is superior to metal or tile. In using it for this purpose the roof should be first covered with boards, either planed or as they come from the mill, (either green or dry,) and then the coating applied to the outer surface to the thickness of an eighth or a quarter of an inch. When it becomes dry it will be as smooth as a solid piece of slate, and as useful for the purpose, without its weight or brittleness. Besides its great utility for purposes of roofing, it is at the same time cheap; it can be made at less cost than is now charged for the poorest composition of coal-tar, gravel, and paper used for the same purpose. The same composition is equally valuable as a coating for houses, as it will protect their exposed surfaces from fire as well as the action of the weather, and at the same time preserve the wood from mold or decay. As a coating for the outer surfaces of ships or other vessels it is of the highest advantage. It not only protects them against leaks, but also against many of the injurious effects of the water, and at the same time shields them from the many other injurious influences to which their surfaces are subject. It adds to their strength, and when polished enables them to glide through the water with less friction than if copper-lined or sheathed. My composition is also superior to all other articles in use as a coating for casks or other vessels used for whale oil, petroleum, spirits of turpentine, or other searching liquids, as it answers the double purpose of protecting against leakage as well as against fire, and at the same time adds to their security, whether in store or in transportation. The same composition, with a slight modification of some of the materials used, becomes an excellent article for coating furniture, carriages, wagons, agricultural implements. In the coating of carriages, where a very smooth and highly-polished surface is required, it is equal to ten coats of paint put on in the ordinary way. In all articles upon which it is desired to have a smooth bright surface I cover the coating with a mixture of shellac dissolved in alcohol. I can also modify my composition so that it may be used for the soles of boots and shoes, for floors, sidewalks, and all similar purposes. I also use it to make pipes, bowls, pitchers, walking-sticks, picture-frames, hat-forms, &c., as well as for lining all kinds of boxes used as bearings for shafting, or in which the axles of machinery or railroad cars turn, and for other rubbing-surfaces of all kinds.

Having thus described my invention, what I claim is—

1. The compound consisting of vegetable fiber, soap-stone, silicate of soda, or its equivalent, red lead, and litharge, substantially as described and for the purposes set forth.

2. The compound consisting of vegetable fiber, soap-stone, silicate of soda, or its equivalent, red lead, and litharge, when coated on wood, cloth, leather, brick, stone, iron, or other fibrous, porous, or solid substances, and treated with a solution of muriatic acid, consisting of one part of the acid to three parts of water, substantially as described and for the purposes set forth.

3. I claim, as a new article of manufacture, the composition substantially as herein described and for the uses and purposes set forth.

ANTONIO PELLETIER.

Witnesses:
P. T. DODGE,
JNO. JOHNSON.